2,841,615

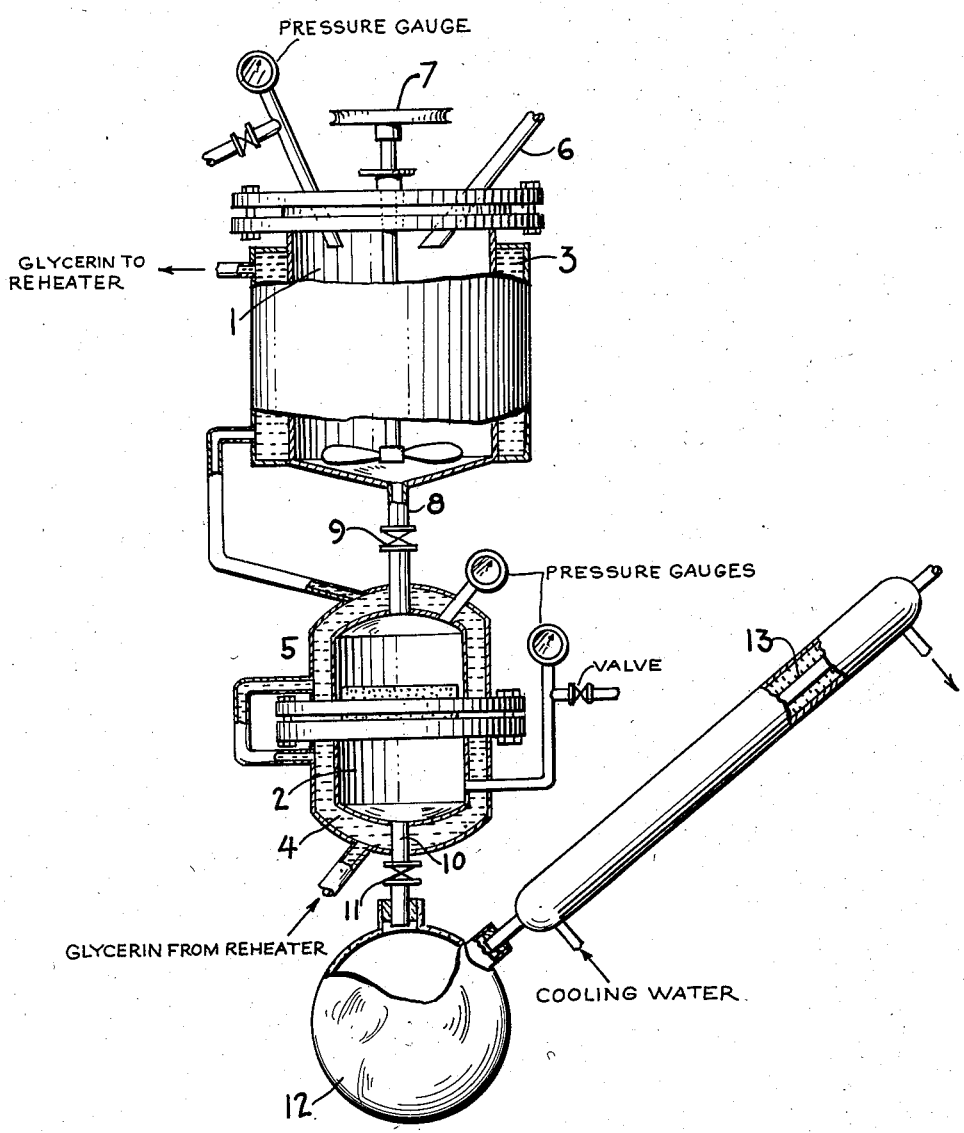

PROCESS FOR THE RECOVERY OF TEREPHTHALIC ACID FROM SOLUTIONS CONTAINING ALKALI METAL SALTS OF TEREPHTHALIC ACID

Hartwig Schütt, Hagen, Westphalia, Werner Stein and Franz Rank, Dusseldorf-Holthausen, and Hubert Schirp, Dusseldorf, Germany, assignors to Henkel & Cie. G. m. b. H., Dusseldorf-Holthausen, Germany, a corporation of Germany Application December 28, 1956, Serial No. 631,093

Claims priority, application Germany January 5, 1956

5 Claims. (Cl. 260—525)

This invention relates to a process for the recovery of terephthalic acid from aqueous solutions containing alkali metal salts of terephthalic acid, and more particularly to such a recovery process employing benzene carboxylic acids or their acid salts as the principal separation agent.

In the production of alkali metal salts of terephthalic acid which comprises heating the alkali metal salts of such mononuclear aromatic carboxylic acids as orthophthalic acid, isophthalic acid, benzoic acid and benzene carboxylic acids to temperatures above 340° C. in an inert atmosphere, as disclosed in co-pending applications Serial No. 392,512, filed November 16, 1953, now abandoned, Serial No. 395,609, filed December 1, 1953, now abandoned and Serial No. 582,087, filed May 2, 1956, a reaction product is obtained which contains substantial quantities of alkali metal terephthalates. The co-pending applications above referred to further disclose a method of separating terephthalic acid from the reaction product which comprises dissolving the soluble components of the reaction product, including the alkali metal terephthalate, in water and acidifying the resulting aqueous solution with an acid which is stronger than terephthalic acid, particularly with hydrochloric or sulfuric acid. The acidification of the aqueous solution transforms the alkali metal terephthalate into terephthalic acid which precipitates out, while the alkali metal cation combines with the anion of the stronger acid to form the soluble neutral-reacting salt of the stronger acid which remains in solution.

While the above-described method of recovering terephthalic acid from such aqueous solutions produces virtually quantitative yields of pure terephthalic acid, it has a serious disadvantage in that the alkali metal is recovered in a form which is not suitable for direct reemployment as a starting material in the production of more terephthalic acid by the heat treatment method disclosed in said co-pending applications. In other words, the soluble alkali metal salt remaining in solution after the terephthalic acid has precipitated is neither capable of being rearranged into an alkali metal terephthalate by the heat treatment nor suitable for the formation of alkali metal salts of mononuclear carboxylic acids which, in turn, may be transformed into alkali metal terephthalates under the stated conditions. In order to be made suitable for the latter purpose, the acidified aqueous solution of the soluble alkali metal salt formed during the precipitation of the terephthalic acid must be evaporated to dryness, and the dry salt obtained thereby must then be transformed by separate reactions into the corresponding alkali metal hydroxide or carbonate. Only in that form can the alkali metal be used to form alkali metal salts of aromatic carboxylic acids capable of being arranged into alkali metal terephthalates.

It is an object of the present invention to provide a method for the recovery of terephthalic acid from aqueous solutions comprising substantial quantities of an alkali metal terephthalate, which will not only produce virtually quantitative yields of pure terephthalic acid, but also enable the alkali metal salt remaining in solution to be used directly as a starting material for the production of more alkali metal terephthalate.

Other objects and advantages of the present invention will become apparent as the description thereof proceeds.

The attached drawing is a schematic representation of an apparatus adapted to practice the present invention in general, and particularly the separation procedure described in Example IV of this application.

We have found that these various objects are achieved by dissolving the rearrangement reaction product in a solvent medium, transforming the dialkali metal terephthalate in the solution into monoalkali metal terephthalate by a reaction with benzene carboxylic acids or their acid salts, separating the monoalkali metal terephthalate from the solution, and transforming the monoalkali metal terephthalate into terephthalic acid. The alkali metal thereby recovered practically quantitatively is in a form suitable for direct use as the starting material in the production of more alkali metal terephthalate. For example, by a proper combination of the various process steps the alkali metal is recovered virtually completely in the form of an alkali metal benzene carboxylate, or also as an alkali metal carbonate if the raw rearrangement product has been subjected to a preliminary purification procedure. Either of these compounds can be used directly for the production of more alkali metal terephthalate by the heat treatment process described in said co-pending applications without undergoing any chemical treatment whatsoever.

The term "benzene carboxylic acids" as used herein is intended to indicate those benzene carboxylic acids the alkalic metal salts of which are capable of undergoing a rearrangement into alkali metal terephthalates under the conditions set forth in said co-pending applications, which means benzene carboxylic acids having from 1 to 6 carboxyl groups attached to the benzene ring, with the exception of terephthalic acid, of course. While the potassium salts of these acids are of particular practical importance and are used hereinafter to illustrate the principles involved in the process according to the present invention, it will be readily apparent that other alkali metal salts of these benzene carboxylic acids may be used in analogous fashion, especially the sodium salts, to effect the recovery of terephthalic acid and the alkali metal from reaction products containing substantial quantities of alkali metal terephthalate.

Assuming that the rearrangement reaction product contains dipotassium terephthalate, and using orthophthalic acid as an example of a suitable benzene carboxylic acid, the first step of the process in accordance with the present invention may be represented by the following reaction equation:

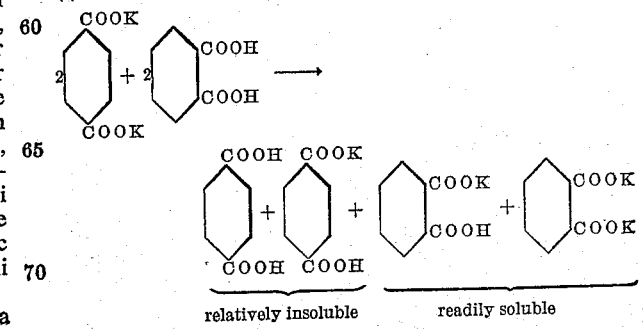

Thus, the reaction between equivalent amounts of dialkali metal terephthalate and orthophthalic acid in the first step produces two relatively insoluble reaction products and two soluble reaction products which are readily separable from each other. The insoluble reaction products contain virtually all of the terephthalic acid value from the dialkali metal terephthalate in the form of practically insoluble free terephthalic acid and difficultly soluble monoalkali metal terephthalate. The soluble reaction products are alkali metal salts of phthalic acid.

The precipitation of the terephthalic acid values may, however, also be effected with the aid of acid salts of benzene carboxylic acids. For example, the reaction between dipotassium terephthalate and monopotassium orthophthalate produces a precipitation and separation of the terephthalic acid value in accordance with the following reaction equation:

(2) 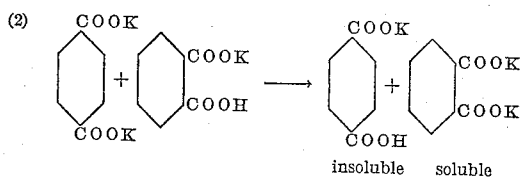
insoluble    soluble

In place of orthophthalic acid or its acid alkali metal salt, any other benzene carboxylic acid or its acid salt may also be used, provided their equivalent valences are taken into consideration. For example, the reaction with benzoic acid takes place according to the following equation:

(3) 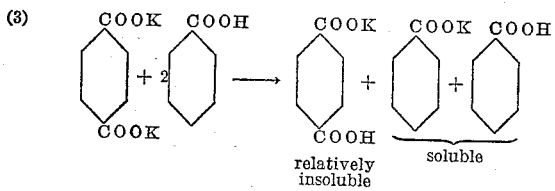
relatively    soluble
insoluble

The partially neutralized benzoic acid, which consists of an equimolar mixture of benzoic acid and potassium benzoate, may also function as an acid salt of a polybasic benzene carboxylic acid and reacts with dialkali metal terephthalates according to the following equation:

(4) 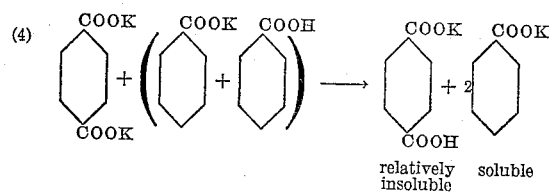
relatively    soluble
insoluble

Consequently, in the performance of the first reaction step of the process in accordance with the present invention, it is not necessary to use an equivalent amount of dialkali metal terephthalate and benzene carboxylic acids or their acid salts, based on the amount of alkali metal present in the solution. For instance, if one-half of an equivalent weight of benzene carboxylic acid or its acid salt is added for each equivalent weight of dialkali metal terephthalate, the reaction product formed thereby is composed of the relatively insoluble acid alkali metal terephthalate and the corresponding soluble salt of the benzene carboxylic acid. On the other hand, however, if the dialkali metal terephthalate in the solution is reacted with more than one-half of an equivalent weight of benzene carboxylic acid, for example with one equivalent weight, the insoluble component of the reaction product is a mixture consisting of free terephthalic acid and its acid alkali metal salt. If the dialkali metal terephthalate is reacted with more than one equivalent weight of benzene carboxylic acid or its acid salt, for example with 2 to 5 equivalent weights, the amount of free telephthalic acid in the insoluble reaction product mixture increases at the expense of the monoalkali metal terephthalate. It is therefore more advantageous to add only that quantity of benzene carboxylic acid or its acid salt which is necessary to convert all of the terephthalic acid in the dialkali metal terephthalate into a relatively insoluble product which consists either entirely of acid alkali metal terephthalate or of a mixture of acid alkali metal terephthalate and various quantities of free terephthalic acid. The acid alkali metal terephthalate may then be further worked up in subsequent reaction steps, as explained below.

The above-described reaction conditions are analogously applicable to the reaction of dialkali metal terephthalates with acid salts of benzene carboxylic acids. However, it should be noted that the reaction with the acid salts extracts fewer alkali metal atoms from the dialkali metal terephthalate the more neutralized carboxyl groups are present in the acid salt of the benzene carboxylic acid; this principle can be readily recognized from a comparison of reaction Equations 1 and 2, and 3 and 4, respectively.

In the second step of the process according to the present invention, the monoalkali metal terephthalate, which may be admixed with terephthalic acid, is transformed into free terephthalic acid. In aqueous solution, an acid alkali metal terephthalate can be transformed into terephthalic acid and the corresponding dialkali metal terephthalate by hydrolysis. However, such a procedure re-converts half of the acid alkali metal terephthalate back into dialkali metal terephthalate, which must then be recycled into the first process step. This can be avoided if the alkali metal atom is removed from the acid alkali metal terephthalate by a reaction with a benzene carboxylic acid.

For this purpose, one equivalent weight of benzene carboxylic acid is generally reacted with one equivalent weight of monoalkali metal terephthalate. It is, however, advantageous to employ two equivalent weights of benzene carboxylic acid per equivalent weight of acid terephthalate, because under these conditions the alkali metal atom of the acid terephthalate combines practically completely with benzene carboxylic acid. This reaction can be illustrated by the following two equations, using orthophthalic acid and benzoic acid as representative examples of suitable benzene carboxylic acids:

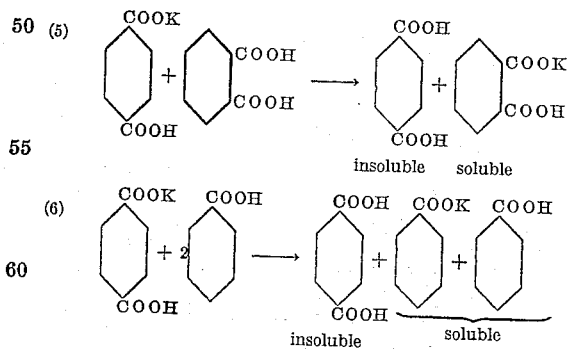

(5)
insoluble    soluble (6)
insoluble    soluble

The reactions represented by Equations 1 to 4 may advantageously be combined with the reactions represented by Equations 5 and 6 into various multi-phase separation processes wherein the intermediate products may be recycled into the process, and the alkali metal is recovered in the form of an alkali metal salt of a benzene carboxylic acid, which may then be directly subjected to the previously referred to rearrangement heat treatment in an inert atmosphere to form more dialakli metal terephthalate. This cyclic process is of great importance for industry, particularly from an economic point of view, and is relatively easy to carry out on a large scale. Using orthophthalic acid as the principal separation reagent, the cyclic process in accordance with the present invention may, for example, be carried out as follows:

*First Phase*—PRINCIPLE OF REACTION (2)

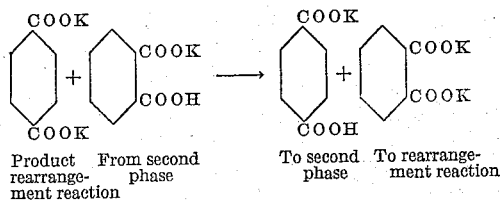

Product From second  To second  To rearrange-
rearrange-  phase     phase     ment reaction
ment reaction

*Second Phase*—PRINCIPLE OF REACTION (5)

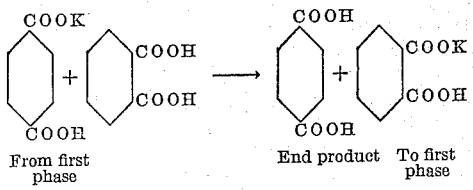

From first           End product  To first
phase                             phase The cyclic process in accordance with the present invention may also be carried out in the following manner:

*First phase*—PRINCIPLE OF REACTION (1)

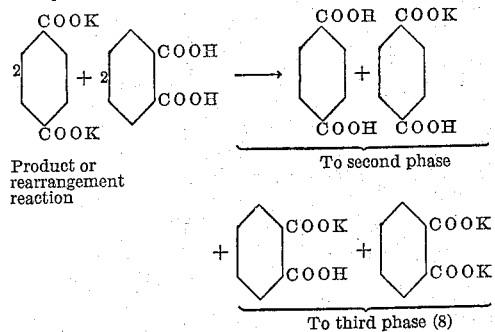

Product or
rearrangement
reaction                        To second phase

To third phase (8)

SECOND PHASE (7)

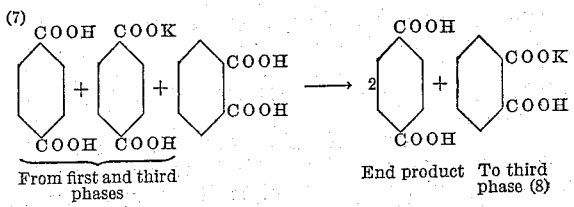

From first and third            End product  To third
phases                                       phase (8)

THIRD PHASE (8)

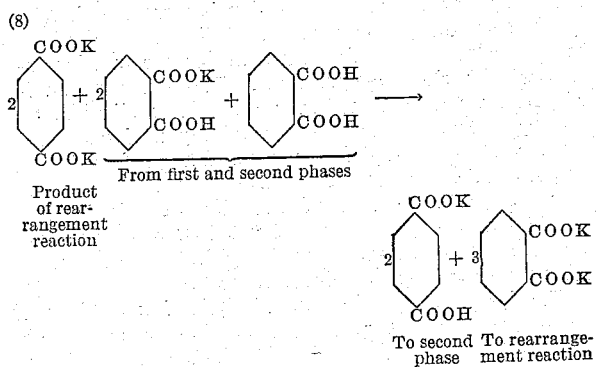

Product         From first and second phases
of rear-
rangement
reaction

To second  To rearrange-
                                phase      ment reaction If benzoic acid is used as the benzene carboxylic acid reagent, the cyclic process may be carried out as follows:

*First Phase*—PRINCIPLE OF REACTION (3)

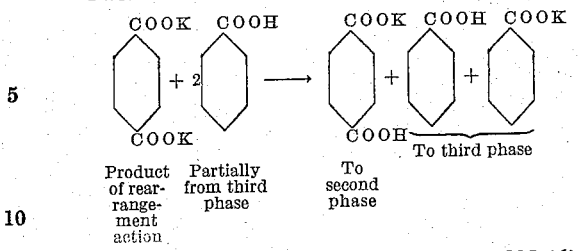

Product   Partially    To
of rear-  from third   second
range-    phase        phase
ment
action

*Second Phase*—PRINCIPLE OF REACTION (6)

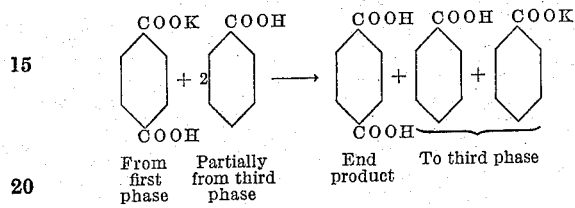

From     Partially    End        To third phase
first    from third   product
phase    phase

*Third phase.*—SEPARATION OF BENZOIC ACID FROM ALKALI METAL BENZOATE BY STEAM DISTILLATION, SUBLIMATION, SOLVENT EXTRACTION OR ANY OTHER SUITABLE METHOD (9)

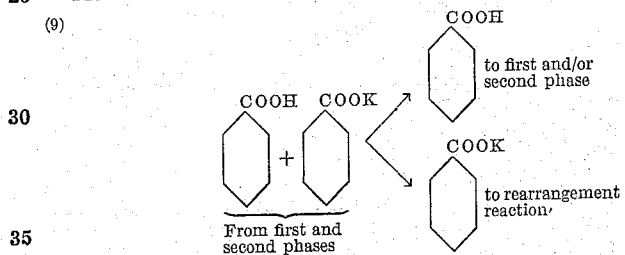

From first and
second phases

In the following paragraphs the conditions under which the various reaction phases are preferably carried out will be described. It must be understood, however, that the conditions described below are those which will produce the optimum results, and that our invention is not limited to the performance of the process under those particular conditions.

In general, all of the above-described reactions are preferably carried out in a suitable solvent medium. Such suitable solvent media include water and/or water-soluble organic solvents. As organic solvents we prefer to employ those which are miscible with water and which have a boiling point of up to 160° C. at atmospheric pressure. The solvent medium may be water or a mixture of water and a suitable organic solvent of the type mentioned in any desired proportion. In the event the benzene carboxylic acids are used in the form of their anhydrides, for example phthalic acid anhydride, the solvent medium must contain at least that amount of water necessary to completely hydrolyze the anhydrides into the corresponding acids. Examples of suitable organic solvents are methanol, ethanol, acetone, dimethylformamide.

The starting material for the process according to the present invention is, as previously indicated, the dialkali metal terephthalate formed by the thermal rearrangement reactions described in the co-pending applications mentioned above. Prior to subjecting the terephthalate to the recovery process disclosed herein, it is advantageous to subject it to a preliminary purification to remove impurities, side products of the thermal rearrangement reaction, excess alkali metal which may be present, for example in the form of an alkali metal carbonate, catalysts and other undesirable materials. This preliminary purification may be accomplished by any desirable method, for instance by recrystallization, filtration and so forth.

All of the reactions in which an acid alkali metal terephthalate or a mixture of an acid alkali metal terephthalate and free terephthalic acid is formed is advantageously carried out in solutions the concentration of which is such that not only the terephthalic acid but also the monoalkali metal terephthalate formed by the reaction are virtually completely precipitated and only minute amounts of the acid terephthalate go into solution. Saturated aqueous solutions of acid potassium terephthalate, for instance, contain from 0.05 to 0.06% by weight of this salt at 20° C. Consequently, the minimum concentration of dipotassium terephthalate in the original solution must be such that the saturation point for the acid terephhalate after completion of the reaction with the benzene carboxylic acid or its acid salts is exceeded. In most cases, however, the dialkali metal terephthalate solutions treated in accordance with the present invention will be more concentrated solutions containing from 1 to 10% by weight of the dialkali metal terephthalate, so that the problem of obtaining a substantial precipitate will not be of great concern. It is even possible to treat dialkali metal terephthalate solutions wherein the saturation concentration—which itself depends on the temperature—has been reached or even exceeded; in other words, saturated solutions and saturated solutions having undissolved dialkali metal terephthalate suspended therein. A saturated aqueous solution of dipotassium terephthalate at 20° C. contains about 15% by weight of terephthalate. Any suspended dialkali metal terephthalate in the saturated solution dissolves in the solvent medium in the course of the reaction and can then react with the benzene carboxylic acid or its acid salt. With increasing amounts of suspended dialkali metal terephthalate, however, a point is reached where the solubility of the benzene carboxylic acid alkali metal salt formed during the reaction is exceeded and the salt is precipitated out of the solution in solid form. Despite the fact that the benzene carboxylic acid salt is more soluble than either the terephthalic acid and the acid alkali metal terephthalate and may therefore be very readily washed out of the precipitate, it is more advantageous to adjust the concentration of the original dialkali metal terephthalate solution so that the alkali metal benzene carboxylate formed during the reaction remains in solution.

The reaction between the dialkali metal terephthalate and the benzene carboxylic acid or its acid salt takes place within a very wide range of temperatures. The lower temperature limit is that at which the solvent medium begins to crystallize out. In general, however, the reaction is carried out at temperatures ranging from 0° C. to 50° C., preferably between 10° C. and 30° C. At higher temperatures up to and including the critical temperature of the solvent medium, especially between 80° C. and 150° C., the monoalkali metal terephthalate formed by the reaction undergoes a disproportionation by hydrolysis into terephthalic acid and dialkali metal terephthalate. The soluble dialkali metal salt of terephthalic acid formed thereby cannot be separated very readily from the benzene carboxylic acid salt and may therefore be recycled into the thermal rearrangement reaction together with said benzene carboxylic acid salt. In general, however, it is advantageous to first separate the precipitated terephthalic acid and monoalkali metal terephthalate from the other components of the reaction mixture, which may readily be accomplished by virtue of the fact that terephthalic acid and its acid alkali metal salt are virtually insoluble while the alkali metal salt of the benzene carboxylic acid is readily soluble. The physical separation of the precipitated reaction products from the soluble reaction products may be achieved by any conventional method, for example by filtration, centrifuging and so forth.

As above indicated, the solution formed in the first reaction phase contains either a soluble acid alkali metal salt of the benzene carboxylic acid or a soluble mixture of the free benzene carboxylic acid and an alkali metal salt thereof. In some cases it is possible to separate the benzene carboxylic acid from the salt by relatively simple methods, such as steam distillation, sublimation, extraction, and the like. The separated acid is then recycled into the first phase, while the dissolved salt is recycled as a reaction component into the thermal rearrangement reaction to form more dialkali metal terephthalate after the solvent medium has been removed by evaporation, for instance.

The acid alkali metal benzene carboxylate recovered from the solution formed in the first reaction phase may, however, also be employed for the reaction with the raw dialkali metal terephthalate, as illustrated by Equations 2 and 8 above. The foregoing remarks relative to the temperature and concentration conditions in connection with the reaction between the dialkali metal terephthalate and the benzene carboxylic acid are, of course, analogously applicable to the reaction of the dialkali metal terephthalate with the acid alkali metal benzene carboxylate.

In the second reaction phase, the monoalkali metal terephthalate formed in the first phase is reacted with a benzene carboxylic acid to form terephthalic acid. In the event that terephthalic acid was precipitated along with the acid terephthalate in the first phase, it is not necessary to separate the two compounds from each other.

After the soluble components of the reaction product of the first phase have been extracted from the solvent medium, the benzene carboxylic acid is admixed with the monoalkali metal terephthalate or with the mixture of acid terephthalate and terephthalic acid in the presence of water and/or water-soluble organic solvents. The components of the second phase reaction mixture may be admixed with each other in any desired sequence. The amount of benzene carboxylic acid in the reaction mixture may vary between 1 and 5 equivalent weights based on the alkali metal in the monoalkali metal terephthalate, but 2 equivalent weights of benzene carboxylic acid are preferred. The concentration of reactants in the solution or suspension in which the second phase of the reaction in accordance with the present invention is carried out may vary also between wide limits. For example, the reaction takes place in solutions or suspensions containing as little as 1% by weight of the combined reactants. In general, however, the reaction mixture will usually contain at least 10% by weight of the combined reactants. The upper limit of concentration is governed largely by the consistency of the reaction mixture. For example, aqueous suspensions containing 40% by weight of combined reactants are still operative at room temperature or slightly elevated temperatures; but more concentrated suspensions containing, for example, 45 to 60% by weight of reactants must be treated at more elevated temperatures.

The reaction of the second phase proceeds smoothly to completion over a wide range of temperatures; for example, it will readily take place at a temperature as low as 10° C. In general, however, it is more advantageous to work at somewhat higher temperatures, primarily because the rate of reaction is increased thereby and because the solubility of the alkali metal salts of the benzene carboxylic acids formed during the reaction increases with rising temperatures. The latter reason is of particular importance when the soluble alkali metal salt has a somewhat smaller solubility at lower temperatures, such as sodium benzoate. The preferred temperature range is from 50° C. to about 150° C., if necessary at elevated pressures. However, it is also feasible to proceed at more elevated temperatures, for example at 200° C. and up to the critical temperature of the aqueous or organic solvent medium.

The insoluble free terephthalic acid formed in the second phase, together with the terephthalic acid which may have been admixed with the monoalkali metal terephthalate at the beginning of the second phase, is then separated from the solution containing the soluble reaction products, by such conventional methods as centrifuging, filtration and so forth. The alkali metal salts in the solution may be recycled into the process in either or both of two ways: first, the solution may be evaporated to isolate the alkali metal benzene carboxylate, which, in turn, is then recycled into the thermal rearrangement reaction to produce more dialkali metal terephthalate; second, the solution may be recycled directly and without evaporation into the first phase reaction to react with the dialkali metal terephthalate obtained from the thermal rearrangement reaction.

The following examples will further illustrate our invention and enable others skilled in the art to understand the invention more completely. It is understood, however, that these examples are cited only for purposes of illustration, and that we do not intend to limit our invention to the particular materials and conditions recited in the examples.

Example I

A mixture of 960 gm. dipotassium terephthalate, obtained by thermal rearrangement of dipotassium orthophthalate, 600 gm. phthalic acid anhydride and 720 cc. water was heated to 190° C. in a rotary autoclave for about 1 hour. After cooling, it was found that 781 gm. of monopotassium terephthalate had formed and precipitated, which corresponds to 96.8% of the theoretical yield. The monopotassium terephthalate was filtered off. The filtrate (filtrate I) was found to contain an equivalent amount of monopotassium orthophthalate. 510 gm. of the monopotassium terephthalate obtained in this manner were admixed with 370 gm. phthalic acid anhydride and 5 liters of water, and the resulting mixture was stirred for 30 minutes at about 90° C. After cooling to room temperature, 410 gm. terephthalic acid having an acid number of 675 were separated from the reaction mixture by filtration. The resulting filtrate was admixed with 605 gm. dipotassium terephthalate and stirred for 30 minutes at room temperature. Thereafter, the reaction mixture was filtered and separated into 490 gm. acid potassium terephthalate (acid No. =275) and a solution of dipotassium orthophthalate. The monopotassium terephthalate was recycled into the second phase to react with phthalic acid anhydride and water, while the dipotassium orthophthalate solution was evaporated and the isolated salt was subjected to the thermal rearrangement reaction to form more dipotassium terephthalate.

Example II 242 gm. dipotassium terephthalate, produced by thermal rearrangement of dipotassium orthophthalate, were purified by crystallization and then dissolved in 1.5 liters of water. Thereafter, 204 gm. monopotassium orthophthalate were added to the solution at 25° C., for instance in the form of filtrate I of Example I. The resulting mixture was stirred for about 15 minutes at the same temperature and filtered on a vacuum filter. 194.0 gm. monopotassium terephthalate (acid No. =275) were obtained as the filter cake. The filtrate was concentrated by evaporation to 300 cc. and allowed to cool. Additional 9.6 gm. of monopotassium terephthalate precipitated out. The mother liquor was free from terephthalic acid, but upon spray-drying thereof 240.0 gm. dipotassium orthophthalate were recovered, which were directly recycled into the thermal rearrangement reaction to produce more dipotassium terephthalate. The monopotassium terephthalate was worked up as described in Example I.

The test was repeated using a more concentrated reaction solution in the first step. More particularly, 242 gm. purified dipotassium terephthalate were added to a solution of 204 gm. monopotassium orthophthalate in 1.5 liters of water. The results were substantially the same.

Example III (a) 605 gm. purified dipotassium terephthalate, obtained from a thermal rearrangement of dipotassium orthophthalate, as described in Example II, and 370 gm. phthalic acid anhydride were suspended in 5 liters of water, and the resulting mixture was refluxed for about 30 minutes accompanied by stirring. A precipitate weighing 468 gm. was obtained which was filtered off on a vacuum filter; it was composed of a mixture of terephthalic acid and monopotassium terephthalate having an acid number of 353.5. The filtrate was free from terephthalic acid, but contained 552 gm. of a mixture composed of dipotassium orthophthalate and monopotassium orthophthalate. The mixture had an acid number of 220.

(b) The filter cake obtained under (a), i. e. the mixture of terephthalic acid and monopotassium terephthalate, was admixed with 271 gm. phthalic acid anhydride and 3 liters of water, and the resulting suspension was boiled for about one hour. After cooling, the suspension was filtered, yielding 370 gm. terephthalic acid (acid No. =675). The filtrate contained 373 gm. monopotassium orthophthalate and was recycled into the process by admixing it with an equivalent amount of dipotassium terephthalate.

(c) The filtrate obtained under (a), i. e. the solution having 552 gm. of a mixture of dipotassium orthophthalate and monopotassium orthophthalate dissolved therein, was partitioned so that one part thereof contained 449 gm. of the mixture. This portion was admixed with 426 gm. dipotassium terephthalate and the resulting solution was stirred at room temperature. Thereafter, it was filtered on a vacuum filter, yielding 349 gm. monopotassium terephthalate (acid No. =277) as a filter cake. The filtrate was free from terephthalic acid, but upon evaporation yielded 514 gm. dipotassium orthophthalate having a moisture content of about 1%. After having been thoroughly dried, the dipotassium orthophthalate was recycled into the thermal rearrangement reaction to produce more dipotassium terephthalate. The monopotassium terephthalate, i. e. the filter cake above, was again admixed with phthalic acid anhydride and water to form terephthalic acid and monopotassium orthophthalate.

Example IV

Referring to the attached drawing, the separation procedure hereinafter described was carried out in an apparatus consisting essentially of two superimposed autoclaves 1 and 2 provided with interconnected heating jackets 3 and 4, and a glass frit filter 5 built into autoclave 2 so that this autoclave could function as a pressure filter. Hot glycerin was continuously circulated through the heating jackets by a recycling pump (not shown) to maintain the autoclaves at the proper temperature. The glycerin withdrawn from heating jacket 3 of autoclave 1 was passed into a suitable reheater (not shown) to bring it up to the proper temperature, and then recycled into the heating jacket 4 of autoclave 2. Autoclave 1 was also provided with a feed line 6 and a stirrer 7. Autoclaves 1 and 2 were connected by duct 8 including a valve 9. The lower autoclave 2 was also provided with a duct 10, including a valve 11, leading into a glass flask 12 provided with a water-cooled reflux device 13.

A solution of 166.5 gm. dipotassium terephthalate in 833.5 gm. water was introduced through feed line 6 into autoclave 1, valve 9 being closed. 210 gm. benzoic acid were added through feed line 6 to the solution in the autoclave while continuously agitating the solution with stirrer 7. The resulting mixture was then heated to 130–140° C. by circulating hot glycerin through the heating jackets and maintained within that temperature range for about one hour at 3 atmospheres gauge while vigorously stirring. At the end of this time valve 9 was opened, while valve 11 was closed, so that the aqueous suspension in autoclave 1 passed into autoclave 2 where it was filtered through the glass frit. As soon as the pressure in the space above the frit had equalized with that in the space below the frit and no further filtration took place, a new pressure differential was created by cautiously discharging the filtrate into flask 12.

In all, 912 gm. of filtrate collected in flask 12, which contained 14.4 gm. dipotassium terephthalate. About 80 gm. terephthalic acid had collected as a filter cake on the glass frit. The terephthalic acid was contaminated with filtrate, but was readily purified by washing with hot water.

While we have disclosed certain specific embodiments of our invention, it will be apparent that the principles disclosed herein are analogously applicable to those embodiments not specifically illustrated. In particular, we emphasize that the process herein disclosed is not limited to potassium and sodium salts of terephthalic acid, but may also be practiced in conjunction with other alkali metal terephthalates obtained by thermal rearrangement of the corresponding alkali metal salts of benzene carboxylic acids. Moreover, other changes and modifications may be made in the various embodiments without departing from the spirit of the invention or the scope of the appended claims.

We claim:

1. In a cyclic process of producing terephthalic acid from reaction products obtained by subjecting a neutral alkali metal salt of a benzene carboxylic acid other than terephthalic acid to a rearrangement reaction at temperatures above 340° C., said reaction products comprising substantial quantities of a dialkali metal terephthalate, the improvement which comprises (step 1) dissolving the dialkali metal terephthalate contained in the reaction product in an inert solvent medium selected from the group consisting of water, water-miscible organic solvents and mixtures thereof, (step 2) reacting the dissolved dialkali metal terephthalate with at least one compound selected from the group consisting of benzene carboxylic acids other than terephthalic acid and their acid alkali metal salts to form the corresponding relatively insoluble monoalkali metal terephthalate and a solution of the corresponding soluble neutral alkali metal salt of said benzene carboxylic acid, (step 3) reacting the monoalkali metal terephthalate from step 2 with a benzene carboxylic acid other than terephthalic acid in the presence of an inert solvent medium selected from the group consisting of water, water-miscible organic solvents and mixtures thereof, to form insoluble terephthalic acid and a solution of the corresponding soluble acid alkali metal salt of said benzene carboxylic acid, separating the terephthalic acid from the solution obtained in step 3, recycling the acid alkali metal salt of the benzene carboxylic acid from step 3 into step 2, and recycling the neutral alkali metal salt of the benzene carboxylic acid from step 2 into the thermal rearrangement reaction to form additional reaction product comprising substantial quantities of dialkali metal terephthalate.

2. The process of claim 1, which comprises in addition subjecting the thermal rearrangement reaction product to a preliminary purification prior to step 1 to remove impurities from the dialkali metal terephthalate contained in said rearrangement reaction product.

3. In a cyclic process of producing terephthalic acid from reaction products obtained by subjecting a neutral alkali metal salt of a benzene carboxylic acid other than terephthalic acid to a rearrangement reaction at temperatures above 340° C., said reaction products comprising substantial quantities of a dialkali metal terephthalate, the improvement which comprises (step 1) dissolving the dialkali metal terephthalate contained in the reaction product in an inert solvent medium selected from the group consisting of water, water-miscible organic solvents and mixtures thereof, (step 2) reacting the dissolved dialkali metal terephthalate with an acid alkali metal salt of a benzene carboxylic acid to form the corresponding relatively insoluble monoalkali metal terephthalate and a solution of the corresponding soluble neutral salt of said benzene carboxylic acid, (step 3) reacting the monoalkali metal terephthalate from step 2 with a benzene carboxylic acid other than terephthalic acid in the presence of an inert solvent medium selected from the group consisting of water, water-miscible organic solvents and mixtures thereof, to form insoluble terephthalic acid and a solution of the corresponding soluble acid alkali metal salt of said benzene carboxylic acid, separating the terephthalic acid from the solution obtained in step 3, recycling the acid alkali metal salt of the benzene carboxylic acid from step 3 into step 2, and recycling the neutral alkali metal salt of the benzene carboxylic acid from step 2 into the thermal rearrangement reaction to form additional reaction product comprising substantial quantities of dialkali metal terephthalate.

4. The process as in claim 1, wherein said dialkali metal terephthalate is selected from the group consisting of dipotassium terephthalate and disodium terephthalate, and said benzene carboxylic acid is selected from the group consisting of benzoic and orthophthalic acid.

5. The process of claim 1 wherein step 3 is carried out at a temperature of at least 100° C. and under pressure.

References Cited in the file of this patent

UNITED STATES PATENTS

| | | |
|---|---|---|
| 2,697,723 | Carlston et al. | Dec. 21, 1954 |
| 2,741,633 | McKinnis et al. | Apr. 10, 1956 |